3,716,636
ACETIC ACID ANHYDRIDE AS A STABILIZER FOR N-METHYL-N-FORMYL AMIDE OF O,O-DIMETHYL DITHIOPHOSPHORYL ACETIC ACID
Hans Helfenberger, Reinach, Basel-Land, Switzerland, assignor to Sandoz Ltd. (also known as Sandoz AG), Basel, Switzerland
No Drawing. Continuation-in-part of application Ser. No. 767,496, Oct. 14, 1968, which is a continuation-in-part of application Ser. No. 678,450, Oct. 26, 1967, which in turn is a continuation of application Ser. No. 416,596, Dec. 7, 1964, all now abandoned. This application June 25, 1970, Ser. No. 49,942
Claims priority, application Switzerland, Dec. 13, 1963, 15,299/63
Int. Cl. A01n 9/36
U.S. Cl. 424—211    12 Claims

ABSTRACT OF THE DISCLOSURE

The invention provides liquid anhydrous pesticidal concentrates containing the N-methyl-N-formyl amide of O,O-dimethyldithophosphoryl acetic acid stabilised with an acid anhydride e.g. acetic anhydride.

---

This is a continuation-in-part of abandoned application Ser. No. 767,496, filed on Oct. 14, 1968, which is in turn a continuation-in-part of now abandoned application Ser. No. 678,450 filed on Oct. 26, 1967, which is in turn a continuation of now abandoned application Ser. No. 416,596 filed on Dec. 7, 1964.

The present invention relates to pesticidal compositions and to a method of stabilizing water-free solutions and emulsifiable concentrates of active materials having a basis of N-methyl-N-formyl amide of O,O-dimethyl-dithiophosphoryl acetic acid, a known pesticide.

Pesticides having a phosphoric acid ester or thiophosphoric acid ester base are mostly marketed in the form of anhydrous emulsifiable concentrates of the pesticidal agent, which concentrates consist of a solution of a phosphoric or thiophosphoric acid ester, an emulsifier and other conventional components including an organic non-aqueous solvent or mixture of solvents. It frequently happens that such preparations have a low stability so that, after storing for some time, especially at high temperatures such as may occur in tropical regions, the active agent content considerably decreases and hence the pesticidal effect of the composition decreases. It likewise frequently happens that preparations which have degraded in this way can no longer be employed; this may be due to the fact that they can no longer be satisfactorily emulsified in water or that they can no longer be handled easily as a result of an increased viscosity.

Attempts have been made to solve the problem of stability by the addition of stabilisers to the concentrates, but it has been found that the various group of compounds which can be used as stabilisers are highly specific to very narrow groups of, or even individual active ingredients. Thus, for example, a compound which is a very useful stabiliser for one particular phosphoric or thiophosphoric acid ester may be quite useless in practice for other closely related phosphoric or thiophosphoric acid esters.

It has now been found that the pesticide N-methyl-N-formyl amide of O,O-dimethyldithiophosphoryl acetic acid can very effectively be stabilised with a low molecular weight aliphatic carboxylic acid anhydride.

The present invention provides a stabilised liquid substantially anhydrous pesticidal composition comprising about 0.5% to 80% by weight of the N-methyl-N-formyl amide of O,O-dimethyl-dithiophosphoryl acetic acid as active pesticidal agent, about 2% to 10% by weight, based on the weight of the pesticidal agent present, of acetic acid anhydride or propionic acid anhydride as stabilising agent, and inert non-polar solvent. The composition preferably contains about 1 to 70% by weight of the pesticidal agent and 2 to 5% by weight, based on the weight of the pesticidal agent, of the stabilizing agent.

The compositions of the invention may also optionally contain from 2 to 15% and preferably from 4 to 6% by weight of an emulsifier. In the case of emulsifiable compositions, the amount to the pesticidal agent present in the composition is preferably about 20 to 40% by weight. The emulsifier may be any suitable emulsifier which is substantially inert to the components of the composition. Suitable emulsifiers are those well known in the art and are preferably nonionic or anionic surface active agents, for example polyglycol derivatives or esters thereof, polyalkylene oxide compounds or alkyl aryl sulphonates. Preferably, the emulsifier is one incorporating calcium dodecylbenzenesulfonate.

As indicated above, the concentrates which constitute the composition of the present invention contain non-polar solvent. The solvent may be any solvent in which the active pesticidal agent, the stabilising agent, and, if present, the emulsifier are soluble, and which is inert to the components of the composition and which is acceptable in a pesticidal composition. Organic solvents which may be used for this purpose are well known in the art and in general have a boiling point in the range 80° C. to 300° C. and preferably in the range 110° C. to 270° C. Examples of such solvents include ketones and in particular ethers, esters, hydrocarbons or mixtures thereof. Suitable esters are those of low molecular weight carboxylic acids for example esters of mono-carboxylic acids containing 2 or 3 carbon atoms (acid residue) with low molecular weight mono- or di-alcohols. Suitable hydrocarbons include aromatic hydrocarbons for example commerically available aromatic hydrocarbon fractions having a boiling range within the range given above. The aromatic hydrocarbons may if desired be diluted with aliphatic hydrocarbons. Examples of suitable aromatic hydrocarbons include those having only one aromatic ring and particularly the lower alkyl benzenes such as xylene and its analogues and toluene. It is however to be emphasised that the solvent, within the limits defined above, does not form a critical part of our invention and that a wide variety and range of solvents can be used without departing from the essence of the invention.

As already indicated, especially suitable anhydrides are the monocarboxylic acid anhydrides, propionic acid anhydride, but more especially, acetic acid anhydride. It has been found that acetic acid anhydride or propionic acid anhydride, in an amount of about 2 to about 5% by weight, based on the weight of active agent provides sufficiently favorable stabilisation.

The stabilized compositions have the same uses as the active agent. Thus, the stabilized compositions are useful for combating insect and acarid pests in the protection of plants, for example spider mites (Tetranychidae sp.), grasshoppers (*Carausius morosus*) e.g. also in the larval stage, aphis, cockroaches (*Periplaneta americana*), etc. The compositions as used (e.g. as aqueous emulsions) may contain up to about 80% by weight of active ingredient when low volume spraying techniques are to be employed and conveniently contain from about 0.005 to 0.2% by weight of active ingredient when conventional high volume spraying techniques are to be used.

The following examples of pesticidal compositions in accordance with the invention are illustrative embodiments.

In the following examples parts and percentages are by weight. Amounts of acetic acid anhydride or propionic acid anhydride are expressed in terms of the total amount by weight employed in making up the anhydrous composition. It is to be understood that amounts of the anhydride are taken up in rendering the compositions substantially anhydrous, e.g. particularly where the solvent and/or the emulsifier contains traces of water. In general, the composition should contain at least 0.5% by weight of the acid anhydride, calculated on the total weight of the composition.

In the examples 1 and 7 concerning emulsifiable compositions, amounts of emulsifier are expressed as the total part by weight of emulsifier together with the emulsifier solvent.

EXAMPLE 1

An active substance-concentrate A suitable for emulsifying in water and consisting of 25 parts of the N-methyl-N-formyl amide of O,O - dimethyl - dithiophosphoryl acetic acid, 8 parts of an emulsifier (e.g. decaethylene glycol mono-p-(1,1,3,3-tetramethylbutyl)-phenyl ether) and 67 parts of a hydrocarbon mixture of equal parts of xylene and an aromatic hydrocarbon fraction of boiling point 203–289° C., is stored for 4 months at 50° C. in closed glass flasks. After such storing, the N-methyl-N-formyl amide of O,O-dimethyl-dithiophosphoryl acetic acid content has fallen to 13 parts.

A corresponding preparation in which two parts of the hydrocarbon mixture had been replaced with two parts of acetic acid anhydride still contained 24 parts of the said active substance after exactly the same storage period, at the same temperature.

The aforesaid decaethylene glycol mono-p-(1,1,3,3-tetramethylbutyl) phenyl ether is commercially available as "Triton X–100." Other polyglycol derivatives may equally as well be employed as emulsifier, this aspect per se being no part of the instant invention proper: thus other "Tritons," e.g. Triton X–151 and Triton X–171, are commercially available emulsifiers useful in the formulation of pesticide emulsifiable concentrates, and these emulsifiers—which chemically are blends of alkyl aryl polyether alcohols with organic sulfonates—can be used individually or in admixture.

The N-methyl-N-formyl amide of O,O-dimethyl-dithiophosphoryl acetic acid, used as the active component in the present example, can be prepared e.g. by reacting the compounds of the formula

with $(CH_3O)_2PSSNH_4$ in e.g. chloroform at about 55° C. and, after completion of the reaction, distilling off the chloroform. The compound

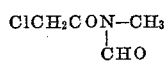

is prepared by reaction $CH_3NHCHO$ with the chloroacetic acid chloride in trichloroethylene at 80° C. and recovering the reaction product by distillation from the reaction mixture.

The aromatic hydrocarbon mixture of boiling point 203–289° C. is also commercially available (e.g. as Shellsol R).

EXAMPLE 2

A preparation of composition A as described in Example 1, paragraph 1, contains 12 parts of the N-methyl-N-formyl amide of O,O-dimethyldithiophosphoryl acetic acid after storing for 20 days at 70° C. in closed glass vessels.

An analogous preparation in which 3 parts of the hydrocarbon mixture had been replaced with 3 parts of propionic acid anhydride, still contains 24 parts of the said active substance after an exactly equal storage period.

EXAMPLE 3

A concentrate of active material consisting of: 25 parts of N-methyl-N-formyl amide of O,O-dimethyl-dithiophosphoryl acetate acid (active material) 8 parts of a block polymer consisting of about 40% of ethylene oxide+about 60% of propylene oxide having a molecular weight of about 4600 (a surfactant known as "Pluronic" P 94) and 67 parts of Cellosolve acetate is stored at 70° C. in a well-stoppered glass flask for 4 days. After storage the content of the active material has decreased to 18.2 parts. An analogous preparation, in which 3 parts of Cellosolve acetate have been replaced by 3 parts of acetic acid anhydride, contains 24.2 parts of the active material after storage for the same period and under the same conditions.

EXAMPLE 4

An emulsifiable concentrate of active material composed of: 25 parts of N-methyl-N-formyl amide of O,O-dimethyl-dithiophosphoryl acetic acid (active material) 10 parts of a mixture of the phosphoric acid mono- and di-ester of an ethoxylated nonylphenol (a surface active agent known as "Alkapent" D 10) and 65 parts of ethylene glycol-diacetate is stored at 70° C. in a well-stoppered glass flask for 8 days. After storage the content of the active material has decreased to 13.2 parts. An analogous preparation, in which 3 parts of ethylene glycol diacetate have been replaced by 3 parts of acetic acid anhydride, contains the same amount of active material, i.e. 25 parts, after storage for the same period under the same conditions.

EXAMPLE 5

An emulsifiable composition consisting of: 25 parts of N-methyl-N-formyl amide of O,O-dimethyl-dithiophosphoryl acetic acid (active material) 5 parts of a mixture of the phosphoric acid mono- and di-ester of an ethoxylated nonylphenol (e.g. a mixture of the compositions known commercially as "Alkapent" D 10 N and "Alkapent" M 60 in a proportion of 2 to 3) and 70 parts of xylene were stored for 8 weeks at a temperature of 50° C. in a well-stoppered glass flask. After this storage the content of active substance had fallen to 14 parts. An analogous composition in which 2 parts of the xylene had been replaced by 2 parts of acetic anhydride was found after storage for the same time and under the same conditions to contain 24.6 parts of active ingredient.

EXAMPLE 6

A pesticidal composition consisting of: 85 parts of technical (94% by weight) N-methyl-N-formyl amide of O,O-dimethyldithiophosphoryl acetic acid (corresponding to 80 parts of pure active ingredient) and 15 parts of xylene were stored at a temperature of 50° C. in a well-stoppered flask for 12 weeks. After this storage the composition contains 62 parts of active ingredient. An analogous composition in which 3 parts of xylene had been replaced by 3 parts of acetic anhydride was found after storage for the same period and under exactly the same conditions to contain 72 parts of active ingredient.

EXAMPLE 7

An emulsifiable composition consisting of: 40 parts of N-methyl-N-formyl amide of O,O-dimethyl-dithiophosphoryl acetic acid (active ingredient) 5 parts of an emulsifier mixture consisting of equal parts of calcium dodecylbenzenesulphonate and the condensation product of isooctyl phenol with 20 moles of ethylene oxide, and 55 parts of xylene was stored in a glass flask at a temperature of 50° C. for a period of 8 weeks. After this period the content of active material had fallen to 21.3 parts. An analogous composition in which 2.5 parts of xylene had been replaced by 2.5 parts of acetic anhydride was found to contain 39.2 parts of active ingredient after storage for the same period under the same conditions.

EXAMPLE 8

Similar to the composition described in Example 7 is an emulsifiable composition comprising the following percentages by weight of the specified constituents: 33% by weight of the N-methyl-N-formyl amide of O,O-dimethyldithiophosphoryl acetic acid, 45.5% by weight of commercial xylene, 15% by weight of Shellsol R, 4.5% by weight of emulsifier as described in Example 7, and 2% by weight of acetic acid anhydride.

EXAMPLE 9

Similar to the compositions described in Example 3 and 6 is a composition comprising the following percentages by weight of the specified constituents: 1.5% by weight of the N-methyl-N-formyl amide of O,O-dimethyldithiophosphoryl acetic acid, 57% by weight of commercial xylene, 41% by weight of odourless kerosene, 0.5% by weight of acetic acid anhydride. In this example, it will be observed that the amount of acetic acid anhydride is 33.3%, based on the weight of pesticidal agent. However, since the xylene and kerosene employed as solvent in the composition are not anhydrous, an amount of the anhydride is taken up in rendering the composition substantially anhydrous.

EXAMPLE 10

Similar to the compositions described in Example 3 and 6 is a composition comprising the following percentages by weight of the specified constituents: 70% by weight of the N-methyl-N-formyl amide of O,O-dimethyldithiophosphoryl acetic acid, 27% by weight of commercial xylene, 3.0% by weight of acetic acid anhydride.

EXAMPLE 11

Similar to the compositions described in Example 3 and 6 is a composition comprising the following percentages by weight of the specified constituents: 50% by weight of the N-methyl-N-formyl amide of O,O-dimethyldithiophosphoryl acetic acid, 29.5% by weight of commercial xylene, 18.5% by weight of Shellsol R, 2.0% by weight of acetic acid anhydride.

EXAMPLE 12

Similar to the compositions described in Example 3 and 6 is a composition comprising the following percentages by weight of the specified constituents: 60% by weight of the N-methyl-N-formyl amide of O,O-dimethyldithiophosphoryl acetic acid, 37.5% by weight of commercial xylene, 2.5% by weight of acetic acid anhydride.

EXAMPLE 13

Similar to the compositions described in Example 3 and 6 is a composition comprising the following percentages by weight of the specified constituents: 5% by weight of the N-methyl-N-formyl amide of O,O-dimethyldithiophosphoryl acetic acid, 61.3% by weight of commercial xylene, 32.5% by weight of odourless kerosene, 1.2% by weight of acetic acid anhydride.

In preparing the compositions of Examples 9 to 13 above the N-methyl-N-formyl amide of O,O-dimethyldithiophosphoryl acetic acid is conveniently first dissolved in the commercial xylene, the specified amount of acetic acid anhydride is added, and where additional solvent is contained in the composition, the resulting solution is diluted with the additional solvent.

What is claimed is:

1. A stabilized liquid substantially anhydrous insecticidal and acaricidal composition comprising an effective amount of about 1% to 80% by weight of the N-methyl-N-formyl amide of O,O-dimethyldithiophosphoryl acetic acid as active insecticidal and acaricidal agent, about 2% to 10% by weight, based on said insecticidal and acaricidal agent present, of acetic acid anhydride as a stabilising agent, and an inactive agent.

2. The insecticidal and acaricidal composition as claimed in claim 1, comprising about 1% to 70% by weight of the insecticidal and acaricidal agent.

3. The insecticidal and acaricidal composition as claimed in claim 1, comprising about 2% to 5% by weight, based on the weight of the insecticidal and acaricidal agent, of the stabilising agent.

4. The insecticidal and acaricidal composition according to claim 3, comprising about 1 to 70% by weight of the insecticidal and acaricidal agent.

5. The insecticidal and acaricidal composition as claimed in claim 1, wherein the inactive agent is xylene, kerosene, aromatic hydrocarbon fractions having a boiling point within 80 to 270° C., cellosolve acetate, ethylene glycol acetate, or a mixture thereof.

6. A stabilised emulsifiable liquid anhydrous insecticidal and acaricidal composition comprising an effective amount of about 20% to 40% by weight of the N-methyl-N-formyl amide of O,O-dimethyldithiophosphoryl acetic acid as active inseticidal and acaricidal agent, about 2% to 10% by weight, based on the weight of said insecticidal and acaricidal agent present, of acetic acid anhydride as a stabilising agent, about 2% to 15% by weight of an emulsifier, and an inactive agent.

7. The insecticidal and acaricidal composition as claimed in claim 6, wherein the emulsifier comprises calcium dodecylbenzenesulfonate.

8. The insecticidal and acaricidal composition as claimed in claim 7, wherein the emulsifier additionally comprises a condensation product of iso-octyl phenol with 20 moles of ethylene oxide.

9. The insecticidal and acaricidal composition as claimed in claim 6, comprising from 4% to 6% by weight of the emulsifier.

10. The insecticidal and acaricidal composition as claimed in claim 6, comprising about 2% to 5% by weight, based on the weight of the active insecticidal and acaricidal agent present, of the stabilising agent.

11. The insecticidal and acaricidal composition as claimed in claim 6, comprising about 2 to 5% by weight, based on the weight of the active insecticidal and acaricidal agent present, of the stabilising agent, and about 4 to 6% by weight of an emulsifier comprising calcium dodecylbenzenesulfonate.

12. A stabilised liquid substantially anhydrous insecticidal and acaricidal composition comprising an effective amount of about 1% to 80% by weight of the N-methyl-N-formyl amide of O,O-dimethyldithiophosphoryl acetic acid as active insecticidal and acaricidal agent, about 2% to 10% by weight, based on the weight of said insecticidal and acaricidal agent present, of acetic acid anhydride as a stabilising agent, and an inactive agent, provided that the composition contains at least 0.5% of acetic acid anhydride based on the total weight of the composition.

References Cited

UNITED STATES PATENTS

| | | | |
|---|---|---|---|
| 2,776,237 | 1/1957 | Clarke et al. | 424—224 |
| 3,178,337 | 4/1965 | Lutz et al. | 424—211 |
| 3,278,369 | 10/1966 | Haering | 424—219 |

JEROME D. GOLDBERG, Primary Examiner

V. D. TURNER, Assistant Examiner